July 26, 1932. T. F. CRARY 1,868,696

ELBOW

Filed Sept. 4, 1930

Thomas F. Crary Inventor

By C.A.Snow&Co.
Attorneys.

Patented July 26, 1932

1,868,696

UNITED STATES PATENT OFFICE

THOMAS F. CRARY, OF MIDDLEPORT, OHIO

ELBOW

Application filed September 4, 1930. Serial No. 479,765.

This invention relates to an adjustable elbow used in connection with sheet metal piping, such as water spouting, stove piping or other sheet metal piping wherein it is necessary to run the piping at an angle.

The primary object of the invention is to provide an elbow of this character, so constructed that the sections of the elbow may be readily and easily disconnected or assembled, without the use of rivets, bolts or other securing means.

Another object of the invention is to provide an elbow wherein a ball joint is provided for connecting the sections of the elbow, the joint being so constructed that one section may be moved to a 90° angle with respect to the other section, to the end that the elbow may be adapted for use in connecting pipes arranged at various angles with respect to each other.

A still further object of the invention is the provision of an elbow of a construction to accommodate the full volume of the pipe line to which it is connected, to the end that the volume of the pipe line is not reduced as in the case of the crimped elbows now in common use.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
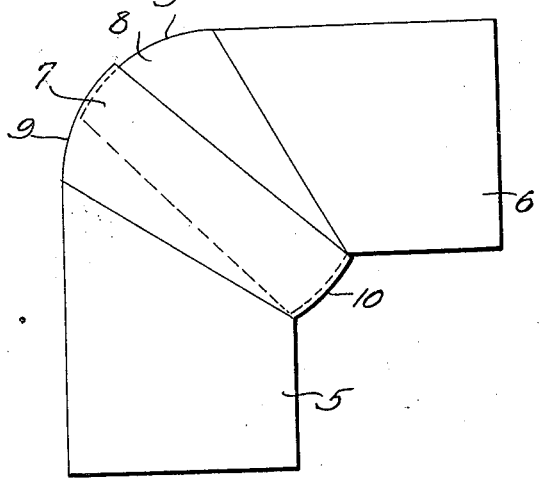
Figure 1 is an elevational view of an elbow constructed in accordance with the invention.
Figure 2:
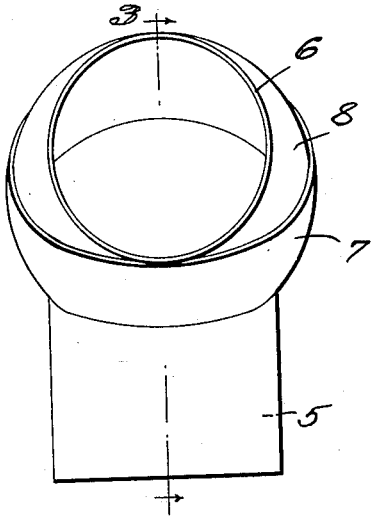
Figure 2 is an end elevational view thereof.

Referring to the drawing in detail, the elbow comprises sections 5 and 6 respectively, the sections being formed with flared extensions 7 and 8 respectively which are curved so that when the sections are brought together in the formation of an elbow, a ball or spheroidal shaped connection is provided, locking the sections together.

Figure 4:
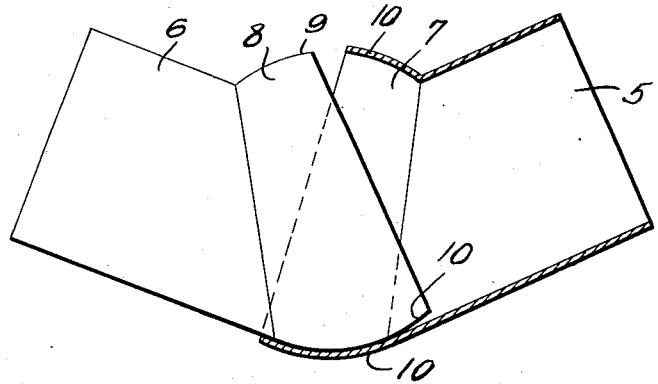
Figure 4 is a view illustrating the manner of assembling or disassembling members of the elbow, one of the members being shown in section.
Figure 3:
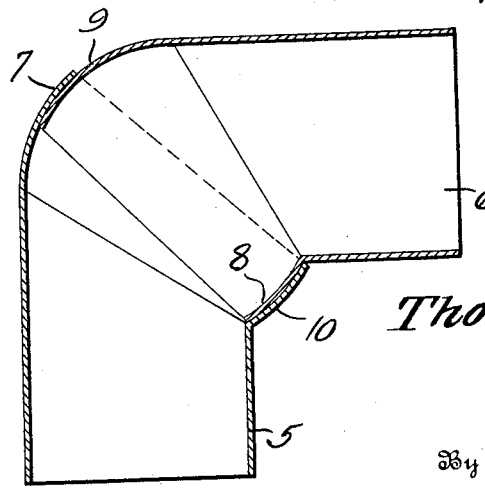
Figure 3 is a longitudinal sectional view through the elbow.

As clearly shown by the drawing, the flared portion of each pipe section is substantially wide at its outer portion as at 9 and tapers to a substantially narrow inner portion indicated at 10, to the end that the wide portions may be fitted together in a manner as shown by Figure 4, whereupon the outer ends of the elbow may be drawn together, causing the flared portion of the section 6 to be held within the flared portion of the section 5.

While the flared portions of the sections are interlocked, it is obvious that one section may be turned to various angles with respect to the other section, thereby adapting the elbow for use in connecting pipes extending at various angles with respect to each other.

Should it be desired to produce an offset in a straight line pipe, or an offset which may be used in fitting piping around corners, it is obvious that the sections may be moved with respect to each other to accomplish this result.

It will of course be understood that the sections forming the elbow are constructed of sheet metal material pressed in shape by means of a suitable pressing machine.

It might be further stated that in the construction of the flared portions of the sections, the outside lines of the curves of the elbow follow from the straight lines of the pipes to which the elbow is connected, around in whatever curve is given, to a direct line with the pipe line leading from the elbow.

I claim:

An elbow comprising pipe sections constructed of sheet metal material, said pipe sections having bulged end portions interlocked to provide an elbow, the bulged portions being wider at the outer side of the elbow than at the inner side of the elbow to permit the sections to be disconnected when the free ends of the sections are moved outwardly in opposite directions.

In testimony that I claim the foregoing as my own, I have hereto affixed my signature.

THOMAS F. CRARY.